United States Patent
Wang et al.

(10) Patent No.: US 9,941,519 B2
(45) Date of Patent: *Apr. 10, 2018

(54) THIN FILM LITHIUM ION BATTERY

(71) Applicants: Tsinghua University, Beijing (CN); HON HAI PRECISION INDUSTRY CO., LTD., New Taipei (TW)

(72) Inventors: Jia-Ping Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 202 days.

This patent is subject to a terminal disclaimer.

(21) Appl. No.: 13/685,802

(22) Filed: Nov. 27, 2012

(65) Prior Publication Data

US 2014/0017552 A1 Jan. 16, 2014

(30) Foreign Application Priority Data

Jul. 13, 2012 (CN) .......................... 2012 1 0242349

(51) Int. Cl.
| | |
|---|---|
| *H01M 4/00* | (2006.01) |
| *H01M 4/66* | (2006.01) |
| *H01M 10/04* | (2006.01) |
| *H01M 10/0525* | (2010.01) |
| *H01M 10/0562* | (2010.01) |
| *H01M 10/0585* | (2010.01) |
| *B82Y 30/00* | (2011.01) |

(52) U.S. Cl.
CPC ....... *H01M 4/663* (2013.01); *H01M 10/0436* (2013.01); *H01M 10/0525* (2013.01); *H01M 10/0562* (2013.01); *H01M 10/0585* (2013.01); *B82Y 30/00* (2013.01)

(58) Field of Classification Search
CPC .... H01M 4/66; H01M 4/663; H01M 10/0525; H01M 10/0562; H01M 10/0585
USPC .......................................................... 429/521
See application file for complete search history.

(56) References Cited

U.S. PATENT DOCUMENTS

| | | | | |
|---|---|---|---|---|
| 6,982,132 | B1* | 1/2006 | Goldner et al. ............. | 429/162 |
| 8,956,765 | B2* | 2/2015 | Wang .................... | H01M 4/667 |
| | | | | 429/152 |
| 9,666,908 | B2* | 5/2017 | Wang .................... | H01M 4/625 |
| 2009/0246625 | A1* | 10/2009 | Lu ......................... | H01M 4/133 |
| | | | | 429/207 |
| 2010/0140554 | A1 | 6/2010 | Oki et al. | |
| 2011/0171371 | A1* | 7/2011 | Li et al. ........................ | 427/122 |
| 2011/0256451 | A1* | 10/2011 | Cui et al. .................... | 429/218.1 |
| 2012/0192931 | A1* | 8/2012 | Jeon et al. .................... | 136/252 |

(Continued)

FOREIGN PATENT DOCUMENTS

| | | |
|---|---|---|
| CN | 101479867 | 7/2009 |
| CN | 102208598 | 10/2011 |

(Continued)

*Primary Examiner* — Nicholas P D'Aniello
(74) *Attorney, Agent, or Firm* — ScienBiziP, P.C.

(57) ABSTRACT

A thin film lithium ion battery includes a cathode electrode, an anode electrode, and a solid electrolyte layer. The solid electrolyte layer is sandwiched between the cathode electrode and the anode electrode. At least one of the cathode electrode and the anode electrode includes a current collector. The current collector is a carbon nanotube layer consisting of a plurality of carbon nanotubes.

20 Claims, 6 Drawing Sheets

(56) References Cited

U.S. PATENT DOCUMENTS

2013/0045413 A1    2/2013  Wang et al.
2013/0095389 A1*   4/2013  Bhardwaj et al. ............ 429/322
2013/0224590 A1    8/2013  Divigalpitiya
2014/0315083 A1    10/2014 Liu et al.

FOREIGN PATENT DOCUMENTS

| CN | 102306800 | 1/2012 |
| CN | 103875103 | 6/2014 |
| TW | 201227769 | 7/2012 |
| WO | WO 2011016616 A2 * | 2/2011 |
| WO | 2011057263 | 5/2011 |

* cited by examiner

THIN FILM LITHIUM ION BATTERY

RELATED APPLICATIONS

This application claims all benefits accruing under 35 U.S.C. § 119 from China Patent Application No. 201210242349.7, filed on Jul. 13, 2012, in the China Intellectual Property Office, the disclosure of which is incorporated herein by reference. The application is also related to copending applications entitled, "METHOD FOR MAKING LITHIUM ION BATTERY", filed Oct. 29, 2012 Ser. No. 13/662,718; "LITHIUM ION BATTERY", filed Oct. 29, 2012 Ser. No. 13/662,727; "METHOD FOR MAKING LITHIUM ION BATTERY ELECTRODE", filed Oct. 29, 2012 Ser. No. 13/662,768; "LITHIUM ION BATTERY ELECTRODE", filed Nov. 14, 2012 Ser. No. 13/676,426; "METHOD FOR MAKING LITHIUM ION BATTERY", filed Sep. 28, 2012 Ser. No. 13/630,004; "THIN FILM LITHIUM ION BATTERY", filed Oct. 29, 2012 Ser. No. 13/662,727; "METHOD FOR MAKING THIN FILM LITHIUM ION BATTERY", filed Nov. 27, 2012 Ser. No. 13/685,803.

BACKGROUND

1. Technical Field

The present disclosure relates to thin film lithium ion batteries.

2. Description of Related Art

A thin film lithium ion battery includes a case, an anode, a cathode, and a solid electrolyte layer. The anode, cathode, and the solid electrolyte layer are encapsulated in the case. The solid electrolyte is located between the anode and the cathode. The cathode includes a cathode current collector and a cathode material layer disposed on a surface of the cathode current collector. The anode includes an anode current collector and an anode material layer disposed on a surface of the anode current collector.

The current collector is used to collect the charge generated by the thin film lithium ion battery during discharge, and to connect to an external power source during the recharging of the thin film lithium ion battery. The current collectors are usually made of metal foils, such as copper foil and aluminum foil. However, the metal foils have a relatively large weight. The power density is calculated by power/weight. Therefore, a large weight of the current collector will decrease the power density of a thin film lithium ion battery. Furthermore, the metal foils may be corroded by the electrolyte, which decreases the life span of the thin film lithium ion battery.

What is needed, therefore, is to provide a thin film lithium ion battery having high power density and long life.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
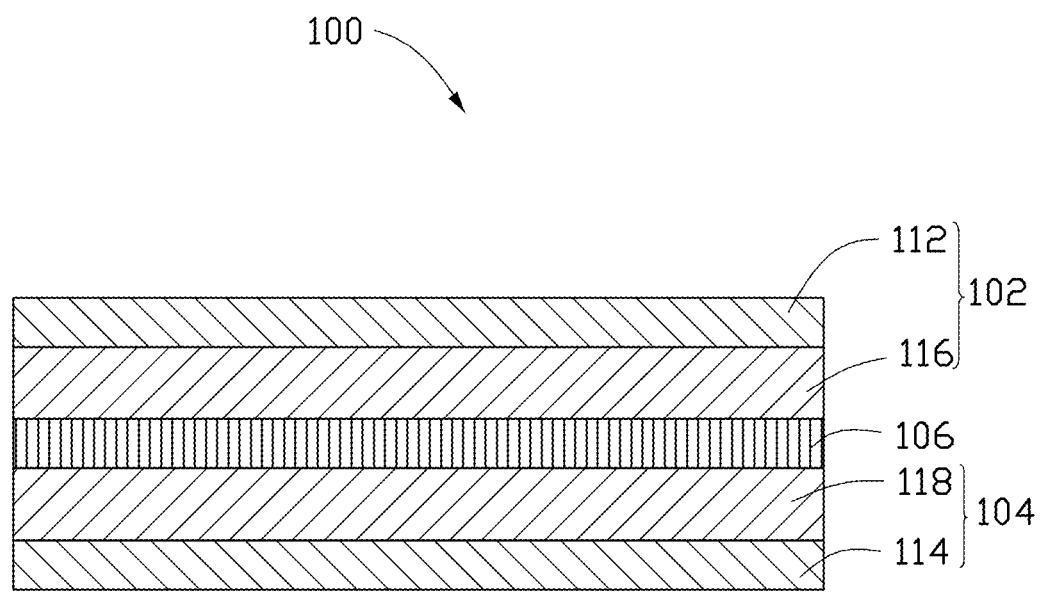
FIG. 1 is a schematic side view of an embodiment of a thin film lithium ion battery.

Referring to FIG. 1, an embodiment of a thin film lithium ion battery 100 includes a battery cell. The battery cell includes a cathode electrode 102, an anode electrode 104, a solid electrolyte layer 106 and an external encapsulating shell (not shown). The cathode electrode 102, the anode electrode 104, and the solid electrolyte layer 106 are encapsulated in the encapsulating shell. The cathode electrode 102 and the anode electrode 104 are stacked with each other and sandwiches the solid electrolyte layer 106. The cathode electrode 102 and the anode electrode 104 can be in contact with the solid electrolyte layer 106. The cathode electrode 102, the solid electrolyte layer 106, and the anode electrode 104 form a battery cell. The thin film lithium ion battery 100 can include a plurality of battery cells stacked together. Adjacent battery cells are separated by an electrolyte layer 106. In the embodiment according to FIG. 1, the thin film lithium ion battery 100 includes one battery cell.

The cathode electrode 102 includes a cathode current collector 112 and a cathode material layer 116 disposed on at least one surface of the cathode current collector 112. The cathode current collector 112 and the cathode material layer 116 can be two separate layers. The anode electrode 104 includes an anode current collector 114 and an anode material layer 118 disposed on at least one surface of the anode current collector 114. The anode current collector 114 and the anode material layer 118 can be two separate layers. In one embodiment, the cathode electrode 102 includes two cathode material layers 116 and one cathode current collector 112 sandwiched between the two cathode material layers 116, and the anode electrode 104 includes two anode material layers 118 and one anode current collector 114 sandwiched between the two anode material layers 118. If the thin film lithium ion battery 100 includes a plurality of battery cells, in every two adjacent battery cells, the cathode material layer 116 in one battery cell and the anode material layer 118 in the other battery cell face each other and sandwiches the solid electrolyte layer 106 therebetween.

The cathode electrode 102 can further include a conducting tab (not shown) electrically connected with the cathode current collector 112. The anode electrode 104 can further include a conducting tab electrically connected with the anode current collector 114. A material of the conducting tab can be metal. With the conducting tab electrically connecting with the cathode current collector 112 or the anode current collector 114, a protecting layer can be coated on surfaces of the conducting tab to protect the conducting tab from being corroded by the electrolyte solution. A material of the protecting layer can be a polymer. The conducting tab is configured to connect the cathode current collector 112 or the anode current collector 114 with outside.

At least one of the cathode current collector 112 and the anode current collector 114 is a graphene layer. If the cathode current collector 112 is the graphene layer, the anode current collector 114 can be a graphene layer, a carbon nanotube layer, or a metallic film. The carbon nanotube layer can include a plurality of carbon nanotubes joined with each other by van der Waals attractive force. A thickness of the graphene layer can be less than 10 micrometers. In some embodiments, the thickness of the graphene layer is in a range from about 10 nanometers to about 200 nanometers. The graphene layer includes at least one graphene. The graphene is a one-atom-thick planar sheet of $sp^2$-bonded carbon atoms that are densely packed in a honeycomb crystal lattice. The size of the graphene can be very large (e.g., several millimeters). However, the size of the graphene is generally less than 10 microns (e.g., 1 micron). In one embodiment, the graphene layer is a pure structure of graphene. The graphene layer can be or include a single graphene or a plurality of graphenes. In one embodiment, the graphene layer includes a plurality of graphenes stacked with each other or located side by side. The plurality of graphenes is combined with each other by van der Waals attractive force. The graphene layer can be a continuous integrated structure. The term "continuous integrated structure" includes, but is not limited to a structure that is combined by a plurality of chemical covalent bonds (e.g., $sp^2$ bonds, $sp^1$ bonds, or $sp^3$ bonds) to form an overall structure. A thickness of the graphene layer can be less than 1 millimeter. The graphene layer can be a free-standing structure. The term "free-standing structure" includes, but is not limited to, a structure that does not have to be supported by a substrate. For example, a free-standing structure can sustain the weight of itself when it is hoisted by a portion thereof without any significant damage to its structural integrity.

The cathode material layer 116 can include cathode active material, conductive agent, and adhesive. The cathode active material can be lithium manganate ($LiMn_2O_4$), lithium cobalt oxide ($LiCoO_2$), lithium nickel oxide ($LiNiO_2$) or lithium iron phosphate ($LiFePO_4$). The conductive agent can be carbon fiber or carbon nanotube. The adhesive can be polyvinylidene fluoride (PVDF) or polytetrafluoroethylene (PTFE). A thickness of the cathode material layer 116 can be in a range from about 100 micrometers to about 300 micrometer. In one embodiment, the thickness of the cathode material layer 116 is about 200 micrometers.

Figure 2:
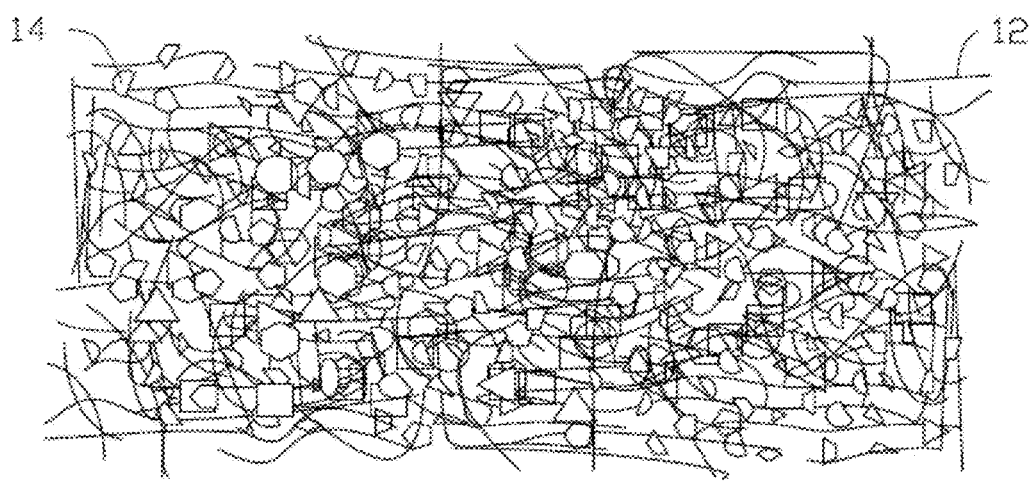
FIG. 2 is a structural schematic view of a cathode material layer of the lithium ion battery of FIG. 1.
Figure 3:
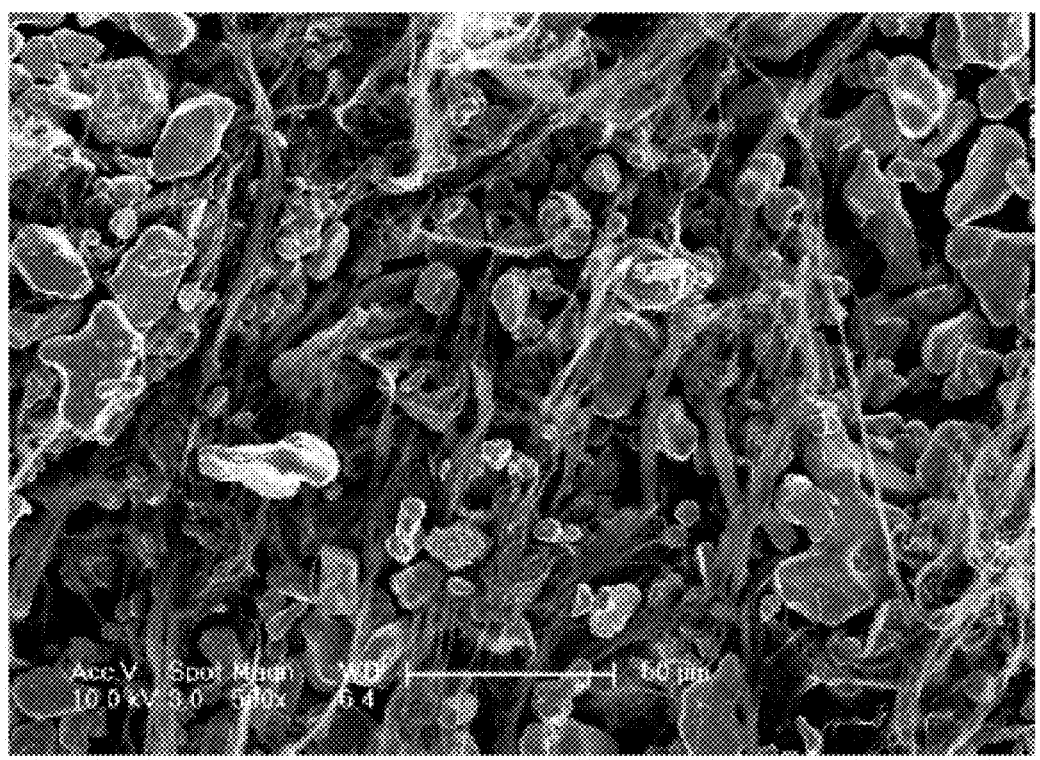
FIG. 3 is a scanning electron microscope (SEM) photo of the cathode material layer of FIG. 2.

In another embodiment, the cathode material layer 116 consists of cathode active material and carbon nanotubes, e.g., the cathode material layer 116 is free of adhesive. The cathode material layer 116 can further include acetylene black, carbon fiber, or any other conductive agent. In the embodiment according to FIGS. 2 and 3, the cathode material layer 116 only includes cathode active material particles 14 and carbon nanotubes 12. A shape of the cathode active material particles 14 is not limited, and can be irregular or regular. A diameter of the cathode active material particles 14 is not limited, and can be less than 15 micrometer. Referring to FIG. 2, in one embodiment, the cathode active material particles 14 can be lithium cobalt oxide particles having a diameter less than 15 micrometer. The carbon nanotubes 12 are entangled with each other and combined by van der Waals attractive force therebetween, thereby forming an integral continuous net structure having a plurality of micropores defined by the carbon nanotubes 12. The plurality of cathode active material particles 14 are dispersed in the net like structure and attached on the surface of the carbon nanotubes 12. The carbon nanotube 12 is pure, and has no impurities adhered thereon. The carbon nanotubes 12 in the thin film lithium ion battery cathode 10 can serve as a conductive material and micro porous carrier to support and fix the cathode active material particles 14. Thus, even without using an adhesive, the thin film lithium ion battery cathode 10 can be an integrative stable structure due to the net structure composed of the carbon nanotubes 12. The cathode active material particles 14 are uniformly distributed in the net structure. Specifically, the cathode active material particles 14 can be adhered on or entangled by the carbon nanotubes, or the cathode active material particles 14 can be wrapped by the carbon nanotubes. The cathode active material particles 14 and the carbon nanotubes are in contact with each other without adhesive therebetween. The cathode active material particles 14 and the carbon nanotubes are fixed together by van der Waals attractive force therebetween. A length of the carbon nanotubes can be longer than 200 micrometers, and the carbon nanotubes can be entangled with each other to form the net structure. As such, the cathode active material particles 14 can be fixed by the net structure, and the cathode material layer 116 is free of adhesive.

The anode material layer 118 can include anode active material, conductive agent, and adhesive. The anode active material can be natural graphite, pyrolysis carbon, or mesocarbon microbeads (MCMB). The conductive agent can be acetylene black, carbon fiber, or carbon nanotube. The adhesive can be PVDF or PTFE. A thickness of the anode material layer 118 can be in a range from about 50 micrometers to about 200 micrometers. In one embodiment, the thickness of the anode material layer 118 is about 100 micrometers.

In another embodiment, the anode material layer 118 consists of anode active material and carbon nanotubes, e.g., the anode material layer 118 is free of adhesive. The anode material layer 118 can further include acetylene black, carbon fiber, or any other conductive agent. In one embodiment, the anode material layer 116 only includes anode active material particles and carbon nanotubes. A shape of the anode active material particles is not limited, and can be irregular or regular. A diameter of the anode active material particles is not limited, and can be less than 15 micrometer. The carbon nanotubes are entangled with each other and combined by van der Waals attractive force therebetween, thereby forming an integral continuous net structure having a plurality of micropores defined by the carbon nanotubes. The plurality of anode active material particles are dispersed in the net like structure and attached on the surface of the carbon nanotubes. The anode active material particles are uniformly distributed in the net structure. Specifically, the anode active material particles can be adhered on or entangled by the carbon nanotubes, or the anode active material particles can be wrapped by the carbon nanotubes. Thus, even without using adhesive, the anode material layer 118 can be an integrative stable structure due to the net structure composed of the carbon nanotubes, and the anode material layer 118 is free of adhesive.

A material of the solid electrolyte layer 106 should have good chemical stability and good lithium ion conductivity. The material can be similar to a conventional solid electrolyte layer. A thickness of the solid electrolyte layer 106 can be in a range from about 10 micrometer to about 1 millimeter. In some embodiments, the thickness of the solid electrolyte layer 106 is in a range from about 10 micrometer to about 50 micrometer. In one embodiment, the material of the solid electrolyte layer 106 is LiPON.

The external encapsulating shell can be a rigid battery shell or a soft encapsulating bag. The conductive tabs are exposed to outside of the external encapsulating shell, thereby connecting the external circuit.

The graphene layer used as the cathode current collector 112 and/or the anode current collector 114, has relatively good conductivity, stable chemical and electrical stability, and low weight. Therefore, the cathode current collector 112 and/or the anode current collector 114 can have a low weight, and the current collector does not corrode easily, and thus has a relatively long lifespan. As such, the thin film lithium ion battery 100 has a high power density and long lifespan.

Figure 4:
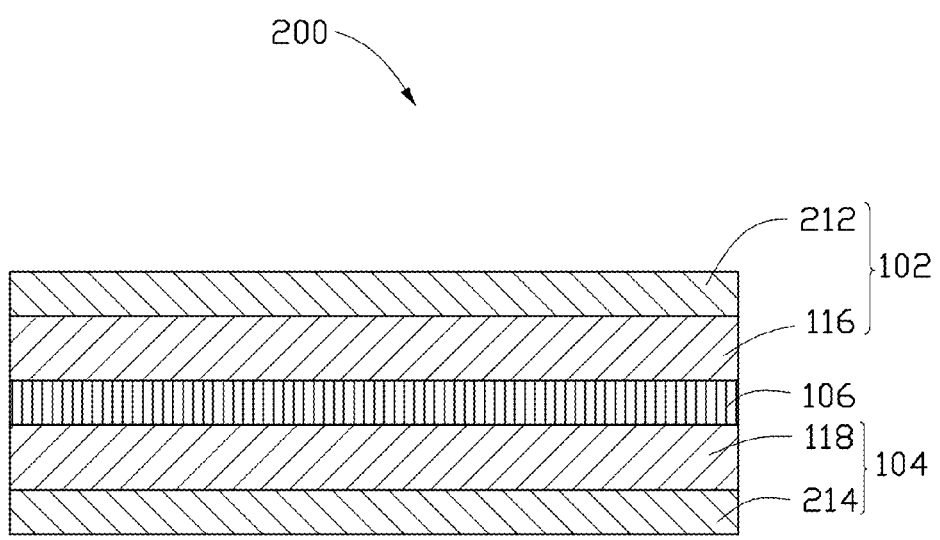
FIG. 4 is a schematic side view of another embodiment of a thin film lithium ion battery.

Referring to FIG. 4, another embodiment of a thin film lithium ion battery 200 is provided. The thin film lithium ion battery includes a cathode current collector 212 and an anode current collector 214.

At least one of the cathode current collector 212 and the anode current collector 214 includes a carbon nanotube layer and a graphene layer. A cathode current collector 212 or an anode current collector 214 can consist of the carbon nanotube layer and the graphene layer. When the cathode current collector 212 includes the carbon nanotube layer and the graphene layer, the anode current collector 214 can be a graphene layer, the carbon nanotube layer, or a metallic film. In one embodiment, both the cathode current collector 212 and the anode current collector 214 include the carbon nanotube layer and the graphene layer. The carbon nanotube layer and the graphene layer are stacked with each other. In one embodiment, the cathode current collector 212 includes the carbon nanotube located on a surface of the cathode material layer 116, and the graphene layer located on a surface of the carbon nanotube layer, that is, the carbon nanotube layer is sandwiched between the cathode material layer 116 and the graphene layer. In another embodiment, the cathode current collector 212 includes the graphene layer located on a surface of the cathode material layer 116, and the carbon nanotube layer located on a surface of the graphene layer, such that the graphene layer is sandwiched between the cathode material layer 116 and the carbon nanotube layer. In one embodiment, the anode current collector 214 includes the carbon nanotube layer located on a surface of the anode material layer 118, and the graphene layer located on a surface of the carbon nanotube layer, such that the carbon nanotube layer is sandwiched between the anode material layer 118 and the graphene layer. In another embodiment, the anode current collector 214 includes the graphene layer located on a surface of the anode material layer 118, and the carbon nanotube layer located on a surface of the graphene layer, such that the graphene layer is sandwiched between the anode material layer 118 and the carbon nanotube layer.

The graphene layer has similar structures to the graphene layer discussed above.

The carbon nanotube layer includes a plurality of carbon nanotubes uniformly distributed therein. The carbon nanotubes in the carbon nanotube layer can be combined with each other by van der Waals attractive force therebetween. The carbon nanotube layer can be a pure structure of carbon nanotubes, that is, the carbon nanotube layer only includes carbon nanotubes. The carbon nanotubes can be disorderly or orderly arranged in the carbon nanotube layer. The term 'disorderly' describes the carbon nanotubes being arranged along many different directions, such that the number of carbon nanotubes arranged along each different direction can be almost the same (e.g. uniformly disordered), and/or entangled with each other. The term 'orderly' describes the carbon nanotubes being arranged in a consistently systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube layer can be single-walled, double-walled, or multi-walled carbon nanotubes. The thickness of the carbon nanotube layer is not limited, and can be in a range from about 0.5 nanometers to about 1 centimeter. In one embodiment, the thickness of the carbon nanotube layer is in a range from about 1 micrometer to about 1 millimeter. The carbon nanotube layer can include at least one carbon nanotube film. In the carbon nanotube layer, more than one carbon nanotube film can be stacked together.

The carbon nanotube layer can include at least one drawn carbon nanotube film. The drawn carbon nanotube film includes a plurality of successive and oriented carbon nanotubes joined end-to-end by van der Waals attractive force therebetween. The carbon nanotubes in the carbon nanotube film can be substantially aligned in a single direction. The drawn carbon nanotube film can be formed by drawing a film from a carbon nanotube array that is capable of having a film drawn therefrom. The plurality of carbon nanotubes in the drawn carbon nanotube film are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. The drawn carbon nanotube film is capable of forming a free-standing structure. The term "free-standing structure" includes, but is not limited to, a structure that does not have to be supported by a substrate. For example, a free-standing structure can sustain the weight of itself when it is hoisted by a portion thereof without any significant damage to its structural integrity. So, if the drawn carbon nanotube film is placed between two separate supporters, a portion of the drawn carbon nanotube film not in contact with the two supporters, would be suspended between the two supporters and yet maintain film structural integrity. The free-standing structure of the drawn carbon nanotube film is realized by the successive carbon nanotubes joined end to end by van der Waals attractive force.

It can be appreciated that some variations can occur in the orientation of the carbon nanotubes in the drawn carbon nanotube film. Microscopically, the carbon nanotubes oriented substantially along the same direction may not be perfectly aligned in a straight line, and some curve portions may exist. It can be understood that a contact between some carbon nanotubes located substantially side by side and oriented along the same direction cannot be totally excluded. More specifically, the drawn carbon nanotube film can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity, and shape. The carbon nanotubes in the drawn carbon nanotube film are also substantially oriented along a preferred orientation. The drawn carbon nanotube film can be a pure structure only including the carbon nanotubes. The thickness of the drawn carbon nanotube film can be in a range from about 0.5 nanometers to about 100 micrometers. The width and length of the drawn carbon nanotube film is not limited. If the carbon nanotube layer includes a plurality of drawn carbon nanotube films, an angle between the aligned directions of the carbon nanotubes in at least two drawn carbon nanotube films can be in a range from about 0 degrees to about 90 degrees, such as about 0 degrees, 15 degrees, 45 degrees, 60 degrees, or 90 degrees.

In another embodiment, the carbon nanotube layer can include at least one flocculated carbon nanotube film formed by a flocculating method. The flocculated carbon nanotube film can include a plurality of long, curved, disordered carbon nanotubes entangled with each other. The length of the carbon nanotube film can be above 10 centimeters. The carbon nanotubes can be randomly arranged and curved in the flocculated carbon nanotube film. The carbon nanotubes can be substantially uniformly distributed in the flocculated carbon nanotube film. The adjacent carbon nanotubes are acted upon by the van der Waals attractive force therebetween, thereby forming an entangled structure with micropores defined therein. Due to the carbon nanotubes in the flocculated carbon nanotube film being entangled with each other, the flocculated carbon nanotube film has excellent durability, and can be fashioned into desired shapes with a low risk to the integrity of the flocculated carbon nanotube film. The flocculated carbon nanotube film can be a free-standing structure due to the carbon nanotubes being entangled and adhered together by van der Waals attractive force therebetween. The thickness of the flocculated carbon nanotube film can range from about 1 micrometer to about 1 millimeter. It is also understood that many of the embodiments of the carbon nanotube structure are flexible and do not require the use of a structural support to maintain their structural integrity. The flocculated carbon nanotube film can be a pure carbon nanotube film that only includes carbon nanotubes.

In another embodiment, the carbon nanotube layer can include at least one pressed carbon nanotube film. The pressed carbon nanotube film can be formed by pressing a carbon nanotube array to slant the carbon nanotubes in the carbon nanotube array. The pressed carbon nanotube film can be a free-standing carbon nanotube film. The carbon nanotubes in the pressed carbon nanotube film are arranged along a same direction, along more than one predetermined different directions, or randomly arranged. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is about 0 degrees to approximately 15 degrees. In some embodiment, the angle is greater than 0 degrees less than 15 degrees. The greater the pressure applied, the smaller the angle obtained. The thickness of the pressed carbon nanotube film can be in a range from about 1 micrometer to about 1 millimeter. The pressed carbon nanotube film can be pure carbon nanotube film only including carbon nanotubes. The length and width of the pressed carbon nanotube film depend on the carbon nanotube array that is pressed. If the length and width of the carbon nanotube array is relatively large, the pressed carbon nanotube film can have relatively large length and width.

The carbon nanotube layer and the graphene layer can combine with each other directly or via conductive adhesive. The carbon nanotube layer includes a plurality of micropores defined by adjacent carbon nanotubes, the graphene layer can cover the plurality of micropores. The carbon nanotube layer can be a supporter configured to support the graphene layer.

Figure 5:
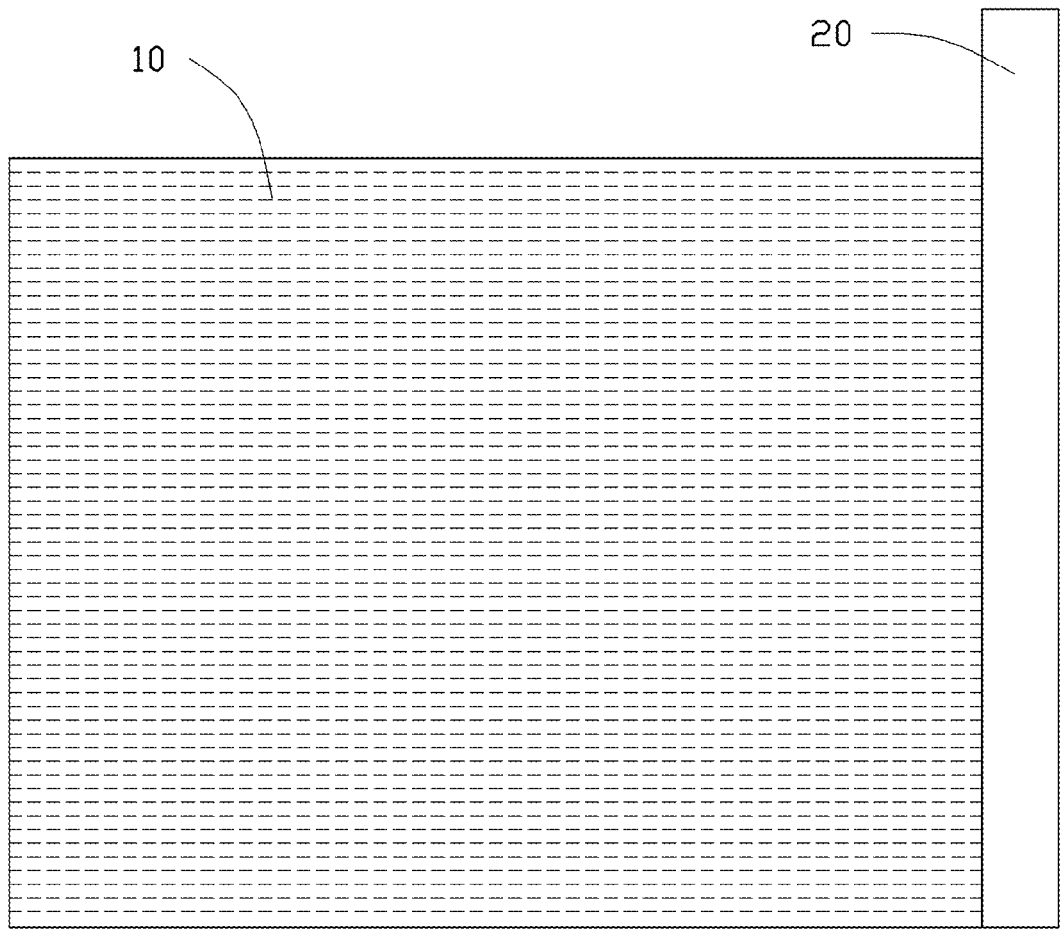
FIG. 5 is a schematic top view of an embodiment of a current collector in the thin film lithium ion battery of FIG. 4.

The thin film lithium ion batter 200 can further include a conducting tab electrically connected with the cathode current collector 212 and/or the anode current collector 214. The conducting tab can be located on a surface of the graphene layer or on a surface of the carbon nanotube layer. In some embodiments, the conducting tab can be located on the surface of the carbon nanotube layer by many methods. Referring to FIG. 5, in one embodiment, the carbon nanotubes in the carbon nanotube layer 10 are aligned along the same direction, the conducting tab 20 can have a strip shape, and the conducting tab 20 can be arranged on the surface of the carbon nanotube layer 10 at one side of the carbon nanotube layer 10. The conducting tab 20 can be overlapped on the side of the carbon nanotube layer 10. The length direction of the strip shaped conducting tab 20 can be substantially perpendicular to the aligned direction of the carbon nanotubes in the carbon nanotube layer 10. The carbon nanotubes have superior conductivity along the axial direction. Therefore, in this arranged manner, the charges in the carbon nanotube layer 10 can be rapidly conducted to the conducting tab 20. The conducting tab 20 can have a line shaped contact and connection area with the carbon nanotube layer 10.

Figure 6:
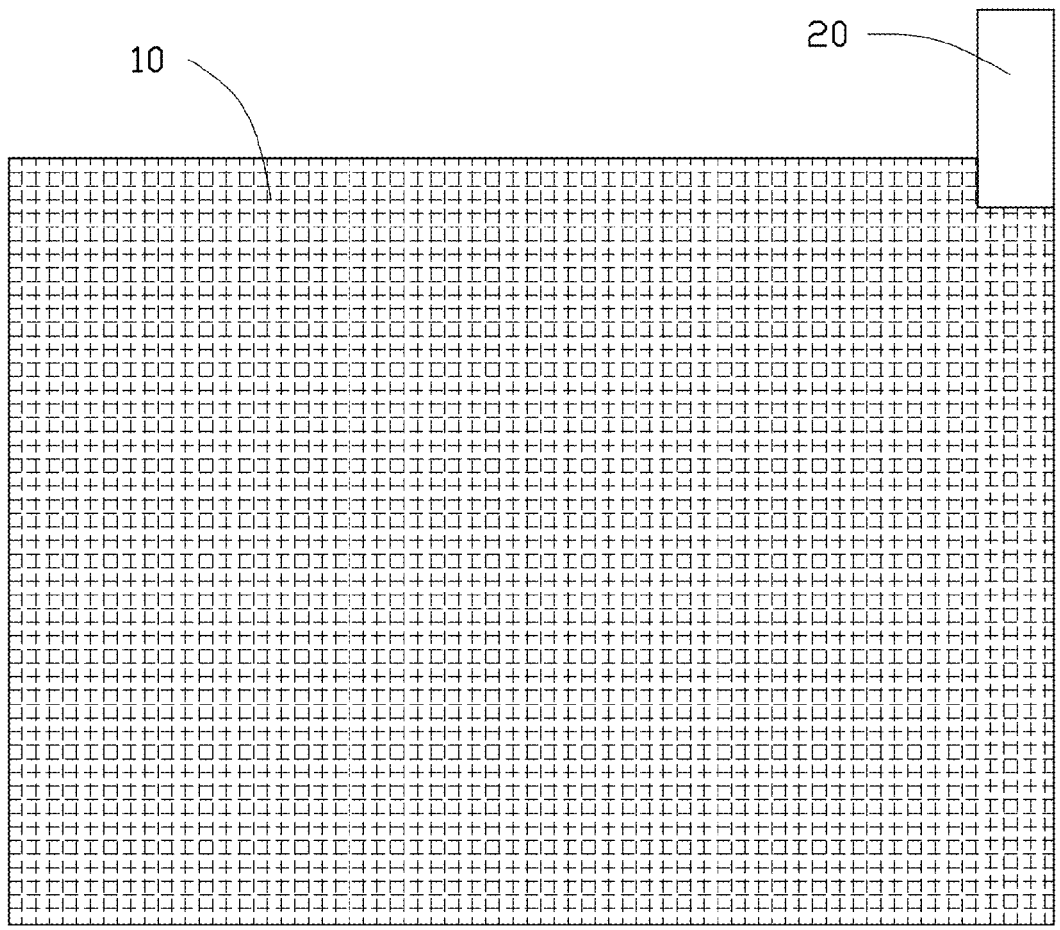
FIG. 6 is a schematic top view of another embodiment of a current collector in the thin film lithium ion battery of FIG. 4.

Referring to FIG. 6, in another embodiment, the carbon nanotubes are disorderly arranged or intercrossed with each other in the carbon nanotube layer 10 to form a conducting network. The conducting tab 20 can have a strip shape and only has an end of the strip in contact with the carbon nanotube layer 10. The conducting tab 20 can be electrically connected to the carbon nanotube layer 10 through a point contact. In one embodiment, the carbon nanotube layer 10 includes at least two stacked drawn carbon nanotube films. The carbon nanotubes in the two drawn carbon nanotube films are substantially perpendicular to each other. The carbon nanotubes in the two drawn carbon nanotube films can be respectively parallel to the two perpendicular edges of the carbon nanotube layer 10. The conducting tab 20 can be arranged at the corner of the carbon nanotube layer 10 formed by the two perpendicular edges.

The other characteristics of the thin film lithium ion battery 200 are the same as the thin film lithium ion battery 100.

In one embodiment, a method for making a thin film lithium ion battery is provided. The method includes the following steps:

S1: providing a cathode material layer and an anode material layer;

S2: applying a cathode current collector on a surface of the cathode material layer to obtain a cathode electrode, wherein the cathode current collector includes a graphene layer;

S3: applying an anode current collector on a surface of the anode material layer to obtain an anode electrode;

S4: applying a solid electrolyte layer between the cathode electrode and the anode electrode, thereby forming a battery cell; and S5: encapsulating at least one battery cell in an external encapsulating shell.

In step S1, the cathode material layer may be formed by the following sub-steps:

S11: making a carbon nanotube source including a number of carbon nanotubes;

S12: providing a cathode active material including a number of cathode active material particles and a solvent;

S13: adding the carbon nanotube source and the cathode active material into the solvent, and shaking the solvent with the carbon nanotube source and the cathode active material with ultrasonic waves; and S14: separating the carbon nanotube source and the cathode active material from the solvent to obtain the cathode material layer.

In step S11, the carbon nanotube source can be made of carbon nanotubes. The carbon nanotubes can be single-walled carbon nanotubes, double-walled carbon nanotubes, or multi-walled carbon nanotubes. The carbon nanotubes can be pure, meaning there is few or no impurities adhered on surface of the carbon nanotubes. In some embodiments, there are no functional groups attached on the carbon nanotubes. A length of the carbon nanotubes can be the same or different. The length of the carbon nanotubes can be longer than 300 micrometers. In one embodiment, the lengths of the carbon nanotubes are substantially the same. A method for making the carbon nanotube source can include providing a carbon nanotube array, wherein the carbon nanotube array can be formed on a substrate, and scratching the carbon nanotube array from the substrate to form the carbon nanotube source. The carbon nanotube source obtained directly from the carbon nanotube array can make the thin film lithium ion battery cathode stronger. In one embodiment, the carbon nanotube array is a super aligned carbon nanotube array. A method for making the carbon nanotube array can be by CVD method, arc discharge method, aerosol method, or any other appropriate method.

In the step S12, the solvent can be ethanol, glycol, acetone, N-Methyl-2-pyrrolidone, water, or combination thereof. In one embodiment, the solvent is ethanol. The solvent is contained in a container, such as a beaker.

In the step S13, the carbon nanotube source and the cathode active material form a mixture. A weight percentage of the carbon nanotubes in the mixture can be in a range from about 0.1% to about 20%. In some embodiments, the weight percentage of the carbon nanotubes can be in a range from about 1% to about 10%. A power of the ultrasonic wave can be in a range from about 400 W to about 1500 W. In some embodiments, the power is in a range from about 800 W to about 1000 W. A time of shaking with the ultrasonic wave can range from about 2 minutes to about 30 minutes. In some embodiments, the shaking time ranges from about 5 minutes to about 10 minutes. The solvent with the carbon nanotube source and the cathode active material can be shaken with ultrasonic waves continuously or at intervals.

In step S14, after the solvent with the carbon nanotube source and the cathode active material is shaken, the carbon nanotubes in the carbon nanotube source and the cathode active material particles in the cathode active material combine with each other to form mixture. The mixture consists of the carbon nanotubes and cathode active material particles. The solvent with the mixture is kept still for about 1 minute to about 20 minutes. The mixture will deposit to a bottom of the container. After the solvent with the carbon nanotube source and the cathode active material is shaken, the carbon nanotubes entangled with each other to form a net structure. The cathode active material particles are wrapped by the net structure and attached on the surface of the carbon nanotubes to form an integral mixture. The cathode active material particles have a larger density than the solvent, and as such, the integrity mixture can be deposited to the bottom of the container. After the mixture has deposited to the bottom of the container, the solvent can be absorbed from the container by a pipe, thereby separating the mixture from the solvent. After the carbon nanotube source and the cathode active material are separated from the solvent, the mixture of the carbon nanotube source and the cathode active material can be dried at a room temperature or at a temperature from about 25 centigrade to about 80 centigrade. After the mixture is dried, the mixture can be cut directly to form the thin film lithium ion battery cathode. In other embodiments, the mixture can be pressed and then cut to form the thin film lithium ion battery cathode. The cathode material layer made by the above method only consists of carbon nanotubes and cathode active material particles.

In step S1, a method for making the anode material layer is similar to the method for making the cathode material layer, except an anode active material is used instead of a cathode active material. The anode material layer made by the above method only consists of carbon nanotubes and anode active material particles.

In step S2, in one embodiment, the cathode current collector can be a graphene layer. A method for making the graphene layer includes the following steps:

S21, providing a metal substrate having a surface;

S22, disposing the metal substrate in a reacting chamber;

S23, heating the metal substrate to a predetermined temperature; and

S24, supplying a carbon source gas into the reacting chamber, thereby forming the first graphene layer on the surface of the metal substrate.

In step S21, the metal substrate can be a metal foil with a thickness in a range from about 100 nanometers to about 100 micrometers. A material of the metal substrate can be copper or nickel. A shape of the metal substrate is not limited. An area of the metal substrate can be set according to the volume of the chamber used to grow the graphene layer by the CVD method. The metal substrate can be rolled up and placed in the chamber to grow the graphene layer with a large area. In one embodiment, the metal substrate is a copper foil with a thickness of about 25 micrometers.

In step S22, the reacting chamber can provide a reaction space for forming the graphene layer. The reacting chamber can have a sealed cavity. The reacting chamber includes a gas inlet and a gas outlet. The gas inlet is used to input a reaction gas. The gas outlet is connected with an evacuating device. The evacuating device can be used to adjust the pressure in the reacting chamber. Furthermore, the reacting chamber can include a water cooling device to adjust the temperature in the reacting chamber. The reacting chamber can be a quartz tube furnace. An area of the metal substrate can be adjusted according to the volume of the reacting chamber. The metal substrate with a relatively large area can be bent or curved so that it can be placed in the reacting chamber.

In step S23, the surface of the metal substrate is heated to become flatter. The flatter the surface, the easier to form the graphene layer on the surface of the metal substrate. The reacting chamber is evacuated before heating the metal substrate. In one embodiment, hydrogen gas can be imported in the reacting chamber through the gas inlet before heating the metal substrate. The hydrogen gas can reduce an oxide layer on the surface of the metal substrate, and can further prevent the metal substrate from oxidizing. A flow rate of the hydrogen gas can be in a range from about 2 standard cubic centimeters per minute (sccm) to about 35 sccm. A heating temperature can be in a range from about 800° C. to about 1500° C. A heating period can be in a range from about 20 minutes to about 60 minutes. A pressure in the reacting chamber can be in a range from about 0.1 Pa to about 100 Pa. In one embodiment, the flow rate of the hydrogen gas is about 2 sccm, the pressure of the reacting chamber is about 13.3 Pa, the heating temperature is about 1000° C., a temperature rising period is about 40 minutes, and the constant temperature period at the heating temperature is about 20 minutes.

In step S24, carbon atoms can be deposited on the surface of the metal substrate, thereby forming the graphene layer composed of carbon atoms. The hydrogen gas is continuously imported through the gas inlet during the process of growing the graphene layer. The flow rate of the hydrogen gas, while supplying the carbon source gas into the reacting chamber, is the same as that of the step S23. A ratio between the flow rate of the carbon source gas and the hydrogen gas is in a range from about 45:2 to about 15:2. The carbon source gas can be at least one of methane, ethane, ethylene, or acetylene. While supplying the carbon source gas, the temperature in the reacting chamber can be in a range from about 800° C. to about 1500° C. with a constant temperature period in a range from about 10 minutes to about 60 minutes. A pressure in the reacting chamber can be in a range from about $10^{-1}$ Pa to about $10^2$ Pa. In one embodiment, the pressure of the reacting chamber is about 66.5 Pa, the temperature of the reacting chamber is about 1000° C., the flow rate of the carbon source gas is about 25 sccm, the carbon nanotube gas is methane, and the constant temperature period is about 30 minutes.

In step S24, the metal substrate can be cooled after forming the graphene layer thereon. While cooling the metal substrate, the carbon source gas and the hydrogen gas can continuously flow into the reacting chamber. The flow rate of the carbon source gas and the hydrogen gas and the pressure of the reacting chamber are constant. In one embodiment, the metal substrate is cooled for about 1 hour. After cooling the metal substrate, the metal substrate with the graphene layer grown thereon is taken out of the reacting chamber. The graphene layer can be separated from the metal substrate.

After the graphene layer is separated from the metal substrate, the graphene layer is attached on a surface of the cathode material layer to form the cathode electrode. A method for separating the graphene layer and the metal substrate can be carried out by removing the metal structure by an acid solution. In another embodiment, the graphene layer can be peeled off the metal substrate directly.

In yet another embodiment, the cathode current collector can further include a carbon nanotube layer located on a surface of the graphene layer. The carbon nanotube layer is applied on a surface of the graphene layer after the graphene layer is attached on the cathode material layer. The carbon nanotube layer can be formed by laying at least one drawn carbon nanotube film, at least one pressed carbon nanotube film or at least one flocculate carbon nanotube film on the surface of the graphene layer. The carbon nanotubes of the drawn carbon nanotube film are parallel to the surface of the drawn carbon nanotube film, thus, when the drawn carbon nanotube film is attached on the surface of the graphene layer, all of the carbon nanotubes of the drawn carbon nanotube film are parallel to the surface of the graphene layer. In one embodiment, the carbon nanotube layer is one pressed carbon nanotube film, and the pressed carbon nanotube film is formed on the surface of the graphene layer by steps of:

A: providing a carbon nanotube array;

B: transferring the carbon nanotube array onto the surface of the graphene layer; and C: pressing the carbon nanotube array.

In step A, the method for making the carbon nanotube array is not limited. In one embodiment, the carbon nanotube array is formed on a substrate by CVD method.

In the step B, the carbon nanotube array is transferred on the surface of the cathode material layer by covering the substrate with the carbon nanotube array on the surface of the cathode material layer, wherein the carbon nanotube array is sandwiched between the substrate and the carbon nanotube layer.

In the step C, a pressing force can be applied on the substrate to press the carbon nanotube array onto the surface of the graphene layer. The substrate can be separated from the carbon nanotube array, and at least part of carbon nanotubes in the carbon nanotube array stays on the surface of the graphene layer to form the carbon nanotube layer. The substrate can be separated from the carbon nanotube array by applying a thin sheet between the carbon nanotube array and the substrate, and then removing the substrate with the carbon nanotube array remaining on the surface of the graphene layer to form the carbon nanotube layer. After the substrate is removed, the carbon nanotube array remaining on the surface of the graphene layer can be further pressed.

In other embodiment, the cathode current collector can be formed on the surface of the cathode material layer by steps of: forming a carbon nanotube layer on a surface of the cathode material layer; and applying the graphene layer on a surface of the carbon nanotube layer, wherein the carbon nanotube layer is located between the graphene layer and the cathode material layer. The method of forming the carbon nanotube layer on the surface of the cathode material layer is almost the same as the method of forming the carbon nanotube layer on the surface of the graphene layer discussed above. The method of applying the graphene layer on the surface of the carbon nanotube layer is almost the same as the method of applying the graphene layer on the surface of the cathode material layer discussed above.

In step S3, if the anode current collector includes a graphene layer and a carbon nanotube layer, the method for making the anode current collector of forming the anode current collector can be almost the same as forming the cathode current collector layer.

The above step S4 can further include the sub-step of pressing the battery cell using a laminator.

Another embodiment of making the thin film lithium ion battery includes the following steps:

N1: providing a solid electrolyte layer having a first surface and a second surface opposite the first surface;

N2: applying a cathode material layer on the first surface of the solid electrolyte layer;

N3: forming a cathode current collector on a surface of the cathode material layer to obtain a cathode electrode, wherein the cathode current collector includes a graphene layer;

N4: applying an anode material layer on the second surface of the solid electrolyte layer;

N5: forming an anode current collector on a surface of the anode material layer to obtain an anode electrode; and N6: encapsulating the cathode electrode and the anode electrode in an external encapsulating shell.

In one embodiment, step N2 includes the following sub-steps: providing a slurry including cathode active material, conductive agent and adhesive; and applying the slurry on the first surface of the solid electrolyte layer by a coating method or spinning method. In other embodiments, the method for making the cathode material layer can be the same as step S1 disclosed above.

Step N3 is almost the same as step S2 disclosed above. In one embodiment, after the slurry is applied on the surface of the first surface of the solid electrolyte layer, the cathode current collector can be formed on the surface of the cathode material layer after the slurry is solidified or before the slurry is solidified. In one embodiment, the cathode current collector is formed on the surface of the cathode material layer before the slurry is solidified, and then the slurry is solidified, so that cathode current collector can combine with the cathode material layer tightly.

In one embodiment, step N4 is almost the same as step N2, but using anode active material instead of cathode active material. In another embodiment, the anode material layer is formed on the second surface of the solid electrolyte layer by coating a slurry of anode active material, conductive agent, and adhesive on the second surface.

Step N5 is almost the same as step N3. The anode current collector has the same structure with the cathode current collector.

Step N6 is the same as step S4 disclosed above.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A thin film lithium ion battery comprising at least one battery cell, the at least one battery cell comprising:
   a cathode electrode comprising a cathode current collector and a cathode material layer;
   an anode electrode; and
   a solid electrolyte layer sandwiched between the cathode electrode and the anode electrode;
   wherein the cathode current collector comprises a graphene layer and a carbon nanotube layer stacked with each other, and the graphene layer is in direct contact with the carbon nanotube layer; and the cathode material layer consists of a plurality of carbon nanotubes forming a net structure and a plurality of cathode active material particles, and the plurality of cathode active material particles is wrapped by the plurality of carbon nanotubes.

2. The thin film lithium ion battery of claim 1, wherein the graphene layer comprises at least one graphene.

3. The thin film lithium ion battery of claim 2, wherein the graphene layer consists of a plurality of graphenes stacked with each other.

4. The thin film lithium ion battery of claim 1, wherein carbon nanotubes of the carbon nanotube layer are aligned along an alignment direction and parallel to a surface of the carbon nanotube layer.

5. The thin film lithium ion battery of claim 4, wherein the cathode current collector further comprising a conducting tab electrically connected to the carbon nanotube layer, the conducting tab is strip shaped and is substantially perpendicular to the alignment direction of the carbon nanotubes.

6. The thin film lithium ion battery of claim 1, wherein the carbon nanotube layer comprises a plurality of carbon nanotube films stacked on top of each other, the carbon nanotubes in each of the plurality of carbon nanotube films are aligned along an alignment direction, and at least two of the plurality of carbon nanotube films are arranged such that the alignment directions of the carbon nanotubes of the at least two of the plurality of carbon nanotube films are substantially perpendicular to each other.

7. The thin film lithium ion battery of claim 1, wherein the carbon nanotubes in the carbon nanotube layer are entangled with each other and randomly dispersed.

8. The thin film lithium ion battery of claim 1, further comprising a conducting tab electrically connected to the carbon nanotube layer through a point contact.

9. The thin film lithium ion battery of claim 1, wherein the anode electrode comprises an anode material layer and an anode current collector, and the anode material layer consists of a plurality of anode active material particles and a plurality of carbon nanotubes.

10. The thin film lithium ion battery of claim 1, wherein the cathode electrode comprises the cathode current collector and two cathode material layers, each of the two cathode material layers is on each of two opposite surfaces of the cathode current collector.

11. The thin film lithium ion battery of claim 1, wherein the anode electrode comprises an anode current collector and two anode material layers, each of the two anode material layers is on each of two opposite surfaces of the anode current collector.

12. The thin film lithium ion battery of claim 1, wherein the carbon nanotube layer and the cathode material layer are two separate layers.

13. The thin film lithium ion battery of claim 12, wherein the carbon nanotube layer is not in contact with the cathode material layer.

14. The thin film lithium ion battery of claim 1, wherein the cathode current collector consists of the graphene layer and the carbon nanotube layer.

15. The thin film lithium ion battery of claim 1, wherein the carbon nanotube layer comprises the plurality of carbon nanotubes joined end-to-end by van der Waals attractive force.

16. The thin film lithium ion battery of claim 1, wherein a length of the plurality of carbon nanotubes is longer than 200 microns.

17. The thin film lithium ion battery of claim 1, wherein the plurality of cathode active material particles is selected from the group consisting of lithium manganate, lithium cobalt oxide, lithium nickel oxide, and lithium iron phosphate.

18. A thin film lithium ion battery comprising at least one battery cell, the at least one battery cell comprising:
   a cathode electrode comprising a cathode current collector and a cathode material layer;
   an anode electrode; and
   a solid electrolyte layer sandwiched between the cathode electrode and the anode electrode;
   wherein the cathode current collector comprises a graphene layer and a carbon nanotube layer stacked with each other, and the carbon nanotube layer consists of a plurality of carbon nanotubes substantially extending along a same direction; and the cathode material layer consists of a plurality of carbon nanotubes and a plurality of cathode active material particles.

19. A thin film lithium ion battery comprising at least one battery cell, the at least one battery cell comprising:
    a cathode electrode comprising a cathode current collector and a cathode material layer;
    an anode electrode; and
    a solid electrolyte layer sandwiched between the cathode electrode and the anode electrode;
    wherein the cathode current collector comprises a graphene layer and a carbon nanotube layer stacked with each other, the graphene layer comprises a first surface and a second surface opposite to the first surface, the carbon nanotube layer comprises a plurality of first carbon nanotubes located on and parallel to the first surface of the graphene layer, and all of the plurality of first carbon nanotubes substantially extend along a same direction.

20. The thin film lithium ion battery of claim 19, wherein the cathode material layer comprises a plurality of cathode active material particles and a plurality of second carbon nanotubes with a length longer than 200 micrometers and forming a net structure, and the plurality of cathode active material particles is wrapped by the plurality of second carbon nanotubes of the net structure.

* * * * *